(12) United States Patent
Hu (10) Patent No.: US 7,458,441 B2
(45) Date of Patent: Dec. 2, 2008

(54) SECUREMENT LATCHES AND ASSOCIATED AIRCRAFT GALLEY CARTS AND METHODS

(75) Inventor: Ben P. Hu, Seattle, WA (US)

(73) Assignee: The Boeing Company, Chicago, IL (US)

( * ) Notice: Subject to any disclaimer, the term of this patent is extended or adjusted under 35 U.S.C. 154(b) by 875 days.

(21) Appl. No.: 10/897,152

(22) Filed: Jul. 22, 2004

(65) Prior Publication Data

US 2006/0070814 A1 Apr. 6, 2006

(51) Int. Cl.
*E05C 19/06* (2006.01)
*E05C 1/00* (2006.01)

(52) U.S. Cl. .............................. 186/45; 292/80; 292/137

(58) Field of Classification Search ................. 292/137, 292/163, 164, 166, 150
See application file for complete search history.

(56) References Cited

U.S. PATENT DOCUMENTS

| | | | |
|---|---|---|---|
| 2,489,493 A | | 11/1949 | Kuenzie |
| 2,939,811 A | | 6/1960 | Dillon |
| 3,085,842 A | | 4/1963 | Johnson |
| 3,205,033 A | | 9/1965 | Stentz |
| 3,297,373 A | | 1/1967 | Andrews et al. |
| 3,542,444 A | | 11/1970 | Webb et al. |
| 3,698,588 A | | 10/1972 | Pogorski |
| 3,823,972 A | | 7/1974 | Ramer |
| 3,828,593 A | * | 8/1974 | Bolton ........................ 70/209 |
| 3,843,174 A | * | 10/1974 | Bogunovich et al. ........ 292/166 |
| 3,847,250 A | | 11/1974 | Sherrill |
| 3,847,458 A | | 11/1974 | Nowak |
| 3,850,714 A | | 11/1974 | Adorjan |
| 3,853,367 A | | 12/1974 | Jamison et al. |
| 3,864,170 A | | 2/1975 | Krieger |
| 3,877,744 A | | 4/1975 | Miller |
| 3,948,347 A | | 4/1976 | Rutledge |
| 4,047,351 A | | 9/1977 | Derner et al. |
| 4,155,611 A | | 5/1979 | Brekke et al. |
| 4,172,915 A | | 10/1979 | Sheptak et al. |
| 4,210,070 A | | 7/1980 | Tatum et al. |
| 4,214,418 A | | 7/1980 | Smith |

(Continued)

OTHER PUBLICATIONS

U.S. Appl. No. 10/731,695, McAvoy.

(Continued)

*Primary Examiner*—Patrick Mackey
*Assistant Examiner*—Mark Beauchaine
(74) *Attorney, Agent, or Firm*—Perkins Coie LLP (57) ABSTRACT

Latches and associated devices, including galley carts, are disclosed. An aircraft galley cart in accordance with an embodiment of the invention can include a body having a payload compartment and sized to move along an aircraft seat aisle. A door can be attached to the body to be movable between an open position and a closed position. A latch can be coupled to at least one of the door and the body, and at least a portion of the latch can be movable between a secured position and an unsecured position. When the latch is in the secured position, the door can be secured with the latch releasably coupling the door and the body together at fewer than three locations. When the latch is in the unsecured position, the door can be movable from the closed position to the open position.

9 Claims, 11 Drawing Sheets

U.S. PATENT DOCUMENTS

| | | | |
|---|---|---|---|
| 4,284,674 A | 8/1981 | Sheptak |
| 4,340,630 A | 7/1982 | Doty |
| 4,346,756 A | 8/1982 | Dodd et al. |
| 4,433,517 A | 2/1984 | Moore, Jr. |
| 4,444,821 A | 4/1984 | Young et al. |
| 4,579,756 A | 4/1986 | Edgel |
| 4,696,954 A | 9/1987 | Pritchard et al. |
| 4,730,748 A | 3/1988 | Bane |
| 4,775,002 A | 10/1988 | Iwamoto |
| 4,821,914 A | 4/1989 | Owen et al. |
| 4,936,377 A | 6/1990 | DeVogel et al. |
| 5,007,226 A | 4/1991 | Nelson |
| 5,106,173 A | 4/1992 | Kelley |
| 5,115,602 A | 5/1992 | de Larrard |
| 5,123,564 A | 6/1992 | Hobson |
| 5,159,973 A | 11/1992 | Pennington et al. |
| 5,194,482 A | 3/1993 | Chundury |
| 5,344,030 A | 9/1994 | Evenson |
| 5,345,814 A | 9/1994 | Cur et al. |
| 5,347,827 A | 9/1994 | Rudick et al. |
| 5,368,380 A | 11/1994 | Mottmiller |
| 5,390,834 A | 2/1995 | Bitter et al. |
| 5,392,960 A | 2/1995 | Kendt et al. |
| 5,404,935 A | 4/1995 | Liebermann |
| 5,407,074 A | 4/1995 | Brightbill |
| 5,433,518 A | 7/1995 | Skov |
| 5,441,170 A | 8/1995 | Bane, III |
| 5,454,427 A | 10/1995 | Westbrooks et al. |
| 5,522,216 A | 6/1996 | Park et al. |
| 5,570,588 A | 11/1996 | Lowe |
| 5,605,344 A | 2/1997 | Insalaco et al. |
| 5,628,241 A | 5/1997 | Chavanaz et al. |
| 5,637,933 A | 6/1997 | Rawlings et al. |
| 5,664,396 A | 9/1997 | Lyman et al. |
| 5,688,031 A | 11/1997 | Tryon |
| 5,936,318 A | 8/1999 | Weiler |
| 5,979,693 A | 11/1999 | Bane, III |
| 6,034,355 A | 3/2000 | Naderi et al. |
| 6,038,830 A | 3/2000 | Hirath et al. |
| 6,109,057 A | 8/2000 | Shervington et al. |
| 6,131,404 A | 10/2000 | Hase et al. |
| 6,139,034 A * | 10/2000 | Williams | 280/47.35 |
| 6,192,703 B1 | 2/2001 | Salyer et al. |
| 6,234,498 B1 | 5/2001 | Saku et al. |
| 6,260,377 B1 | 7/2001 | Tamaoki |
| 6,295,829 B1 | 10/2001 | Gibot et al. |
| 6,408,841 B1 | 6/2002 | Hirath et al. |
| 6,460,952 B1 | 10/2002 | Tryon |
| 6,476,519 B1 | 11/2002 | Weiner |
| 6,483,204 B2 | 11/2002 | Hanaki |
| 6,664,656 B2 | 12/2003 | Bernier |
| 6,672,601 B1 | 1/2004 | Hofheins et al. |
| 6,695,325 B2 | 2/2004 | Carrillo |
| 6,778,414 B2 | 8/2004 | Chang et al. |
| 6,935,641 B2 | 8/2005 | Hahn |
| 6,948,278 B1 * | 9/2005 | Schultz | 49/185 |
| 7,025,121 B2 * | 4/2006 | Whitehead et al. | 165/42 |
| 2002/0088244 A1 | 7/2002 | Jennings et al. |
| 2002/0116936 A1 | 8/2002 | Cartwright et al. |
| 2003/0082357 A1 | 5/2003 | Gokay et al. |
| 2003/0182043 A1 | 9/2003 | Christiansen et al. |
| 2004/0207168 A1 | 10/2004 | Raab et al. |

OTHER PUBLICATIONS

U.S. Appl. No. 10/795,738, Moran et al.

U.S. Appl. 10/813,765, Hu.

Aspen Aerogels, Inc., "Technology—Aerogels are Extraordinary Solid Insulators," Nov. 25, 2003, www.aspenaerogels.com/technolgy2.htm <http://www.aspenaerogels.com/technolgy2.htm>, (3 Pages).

Aspen Aerogels, Inc., "Products—Aspen Aerogels Offers a Range of Flexible Aerogel Blanket Mat," Nov. 25, 2003, www.aspenaerogels.com/products.htm <http://www.aspenaerogels.com/products.htm>, (1 Page).

About Hardigg, How Rotomolding Technology Works (3 pgs); http://www.hardigg.com/about_hardigg/rotomolding.htm; accessed Feb. 26, 2004.

DeKalb Molded Plastics, Structural Foam (3 pgs); http://www.dekalbplastics.com/structural.html; accessed Feb. 25, 2004.

Driessen Aircraft Interior Systems, Full Size Inflight Service Cart (2 pgs) The Netherlands.

Excelfrax 200 VIP Insulation, http://www.unifax.com [accessed Nov. 21, 2003] (2pgs).

Frank, Franz et al., "Systems Development for The More Electric Aircraft", Aerospace Congress & Exhibition, Sep. 10-14, 2001, AIRBUS (19 pgs).

Knobe, B. et al., "Definition of Standard Interfaces for Gallery Insert Equipment—GAIN", ARINC/AEEC GAIN Specification Issue 2, Nov. 19, 2003 (55 pgs).

Knobe, B. et al., "Definition of Standard Interfaces for Gallery Insert Equipment—GAIN", Preliminary ARINC 628 Part 5 Strawman, Aug. 21, 2003 (49 pgs).

Phase Change Materials, http://web.mit.edu/3.082/www/team2_s02/phase_change.html; [accesses Jul. 21, 2004] (1 pg).

SANYO Patented VIP Vacuum Insulation Panel, http://www.sanyobiomedical.com/products/vip.php [accessed Nov. 21, 2003] (2 pgs).

TecRep Engineering, Thermoplastic-structural foam molding (2 pgs); http://www.tecrep.com/thermoplastic_strucfoam.asp; accessed Feb. 25, 2004.

* cited by examiner

SECUREMENT LATCHES AND ASSOCIATED AIRCRAFT GALLEY CARTS AND METHODS

TECHNICAL FIELD

The following disclosure relates generally to securement latches, including latches installed on galley carts for storing and serving food on aircraft.

BACKGROUND

Flight attendants typically serve airline meals from galley carts they move up and down passenger aisles. Conventional galley carts are typically manufactured from aluminum. For example, one known galley cart is manufactured by attaching aluminum sandwich panels to an aluminum frame structure. The sandwich panels can include aluminum skins and a PVC foam or honeycomb core. This galley cart is generally handmade in a labor-intensive process. As a result, this galley cart is relatively expensive to manufacture. In addition, it is relatively heavy and thermally inefficient.

In addition to galley carts, aircraft galleys typically include waste carts for collecting food service waste and other refuse during flight. Conventional waste carts are open at the top like a typical garbage receptacle. In addition, they typically include a plurality of wheels so that they can be easily moved around the aircraft galley. One known galley waste cart manufactured by Kitterman Plastics of 4100 Riverside Street, Kansas City, Mo. 64150, is rotational molded from high-density polyethylene. Rotational molding is a cost-effective way to produce large parts from plastic. The process involves loading plastic resin into a mold that is heated as it is rotated slowly about both the vertical and horizontal axes. Simultaneously heating and rotating the mold causes the melting resin to evenly coat the internal surfaces of the mold. The mold continues to rotate during a cooling cycle so that the finished part has an even wall thickness. While suitable for refuse collection, waste carts are not suitable for food service because, among other things, they lack means for insulating meals and stowing meals in an organized manner.

Current FAA regulations require that the doors of the galley carts be securely latched when closed. Because galley cart doors are typically thin (in order to reduce weight), the current approach to latching the doors has been to outfit the doors with a three-point attachment latch, such as a model 3100 available from Adams Rite Aerospace of Fullerton, Calif. This latch can secure the upper edge, lower edge, and center of the door to the body of the galley cart. Accordingly, the three-point attachment latch can prevent the door from opening or partially opening, even when aircraft accelerations force the contents of the galley cart against the inward facing surface of the door.

While the foregoing latching technique provides adequate securement for the galley cart door, it suffers from several drawbacks. For example, the three-point attachment latch mechanism is relatively complex because it latches the door at three different locations. Accordingly, in some instances, latches of this type can be relatively time-consuming to install and can be more susceptible to failure. Such latches can also be relatively heavy, which in turn can reduce the overall operating efficiency of the aircraft in which they are installed.

SUMMARY

The present invention is directed generally toward securement latches and associated galley carts for storing and serving food on an aircraft. An aircraft galley cart in one aspect of the invention includes a body having a payload compartment and being sized to move along an aircraft seat aisle. The cart can further include a door attached to the body, with the door being movable between an open position and a closed position. A latch can be coupled to at least one of the door and the body, and at least a portion of the latch can be movable between a secured position and an unsecured position. When the latch is in the secured position, the door is secured in the closed position with the latch releasably coupling the door and the body together at fewer than three locations. When the latch in the unsecured position, the door can be movable from the closed position to the open position.

In a particular aspect of the invention, the galley cart door can include a frame portion and a panel portion carried by the frame portion. The frame portion can be attached to the panel portion to resist bending of the panel portion. In a further particular aspect of the invention, the latch can include a detent mechanism positioned to provide audible, tactile or both audible and tactile feedback when the latch moves from the unsecured position to the secured position.

In another aspect of the invention, a latch, which can be installed on an aircraft galley cart or on another device, can include a receptacle unit having an aperture, and a guide having a first guide path and a second guide path generally parallel to the first guide path. The guide can carry a slider that has a grip portion configured to be manipulated by a user, and is movable relative to the guide between a secured position and an unsecured position. The slider can carry a first member that is movable along the first guide path, and a second member that is movable along the second guide path. The second member can be received in the aperture of the receptacle unit when the slider is in the secured position, and can be external to the aperture when the slider is in the unsecured position.

DETAILED DESCRIPTION

The following disclosure describes securement latches and associated methods, which may be installed on aircraft galley carts and other insulated food storage units, and/or on other devices. Certain details are set forth in the following description and in FIGS. 1A-6 to provide a thorough understanding of various embodiments of the invention. Other details describing well-known structures and systems often associated with latches, aircraft galley carts and plastics manufacturing methods are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles, and features without departing from the spirit or scope of the present invention. In addition, further embodiments of the invention may be practiced without several of the details described below.

In the Figures, identical reference numbers identify identical or at least generally similar elements. To facilitate the discussion of any particular element, the most significant digit or digits of any reference number refer to the Figure in which the element is first introduced. For example, element 170 is first introduced and discussed with reference to FIG. 1A.

Figure 1A:
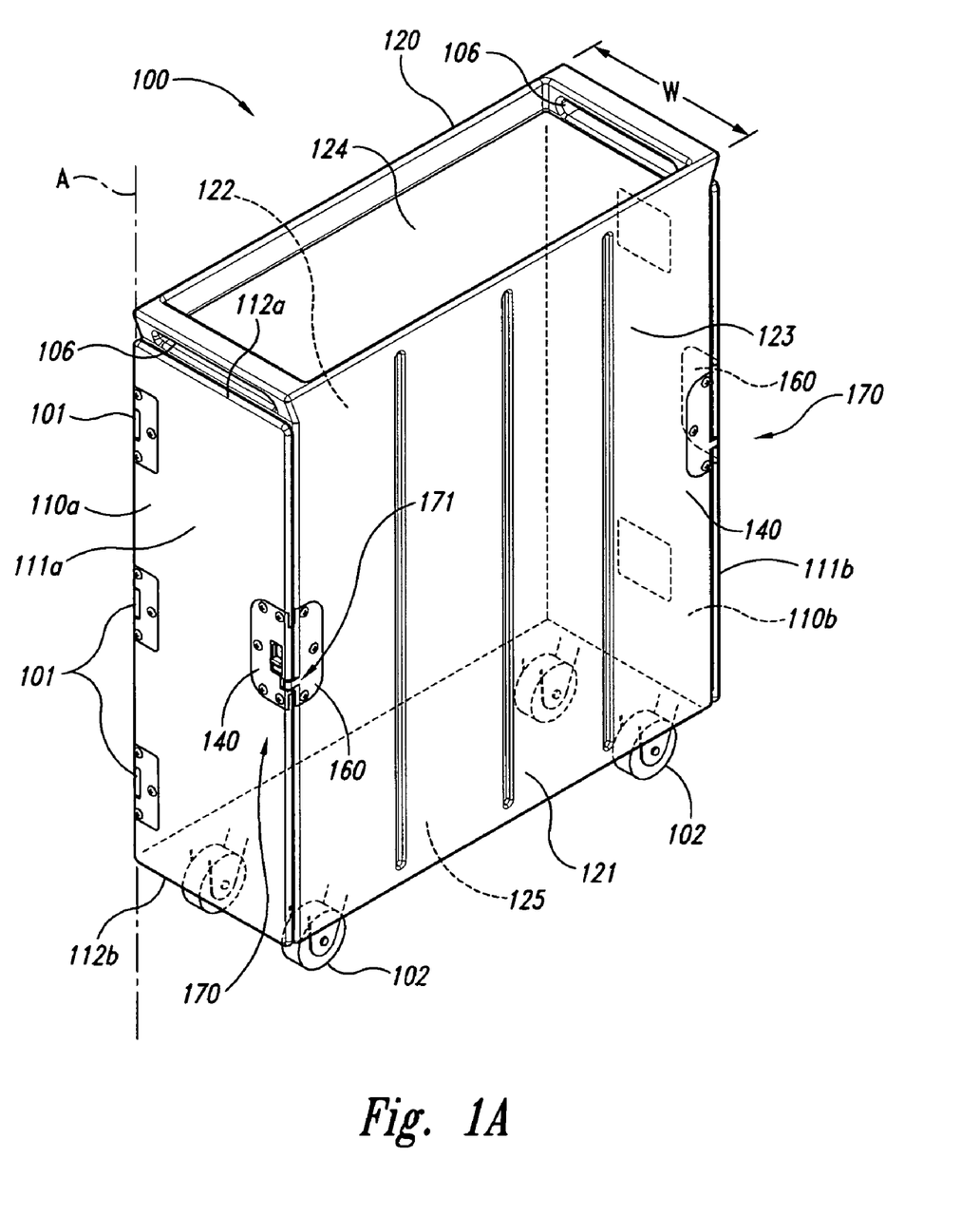
FIGS. 1A-1B are isometric views of a galley cart configured in accordance with an embodiment of the invention.
Figure 1B:
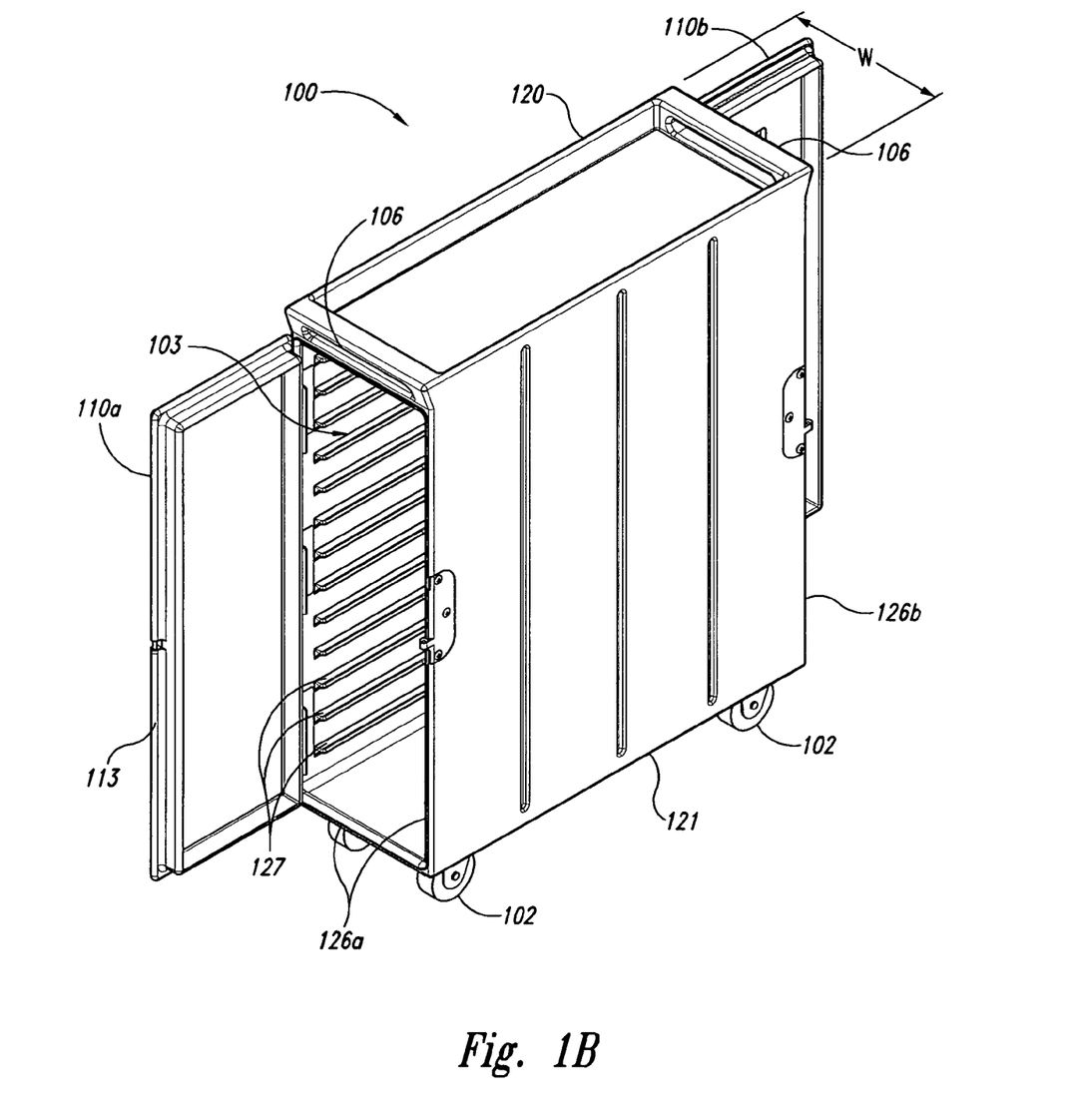

FIGS. 1A and 1B are isometric views of a galley cart 100 configured in accordance with an embodiment of the invention. Referring first to FIG. 1A in one aspect of this embodiment, the galley cart 100 includes a body 120 having a body shell 121. The body shell 121 can have a one-piece plastic construction in one embodiment, and can have other constructions in other embodiments. In the illustrated embodiment, the body shell 121 forms a first side portion 122, a second side portion 123, a top portion 124, and a bottom portion 125 of the body 120. In other embodiments, the body shell 121 can form more or fewer portions of the body 120. For example, in one embodiment, the first side portion 122, the second side portion 123, the top portion 124, and the bottom portion 125 can be formed from individual plastic panels that are fastened together to form the body 120. In another embodiment, the body shell 121 can form the first side portion 122, the second side portion 123, and the top portion 124 of the body 120. In this particular embodiment, a separate panel of metal, plastic, and/or other materials can form the bottom portion 125 of the body 120.

In another aspect of this embodiment, the galley cart 100 further includes a first door 110a positioned toward one end of the body 120, and a second door 110b positioned toward an opposite end of the body 120. Like the body 120, each of the doors 110 can include a door shell 111 (e.g., a one-piece plastic door shell 111) identified individually as a first plastic door shell 111a and second door shell 111b. In addition, each of the doors 110 can further include a plurality of hinges 101 aligned along a pivot axis A, and can have a first or upper edge 112a, and a second or lower edge 112b, both generally transverse to the pivot axis A. The hinges 101 can pivotally attach the door shells 111 to the body shell 121. For each door 110, the galley cart 100 can further include a latch 170 having first latch portion 140 attached to one of the door 110 and the body 120 and configured to releasably engage a corresponding second latch portion 160 attached to the other of the door 110 and the body 120.

In a particular aspect of this embodiment, the latch 170 releasably couples each door 110 to the body 120 at fewer than three latch locations. For example, the latch 170 can include a single latch location 171 positioned between the upper and lower edges 112a, 112b of the door 110. In other embodiments, one or more latches 170 can secure the door 110 at two locations. Accordingly, the latches 170 can securely, yet releasably maintain the doors 110 in their closed positions, while also providing advantages described in greater detail below with reference to FIGS. 1C-1E.

When the first latch portion 140 is disengaged from the corresponding second latch portion 160, a user can open the corresponding door 110 outwardly to provide access to an interior portion 103 of the body 120 (e.g., a payload compartment) as illustrated in FIG. 1B. In a further aspect of this embodiment, the interior portion 103 of the body 120 can include a plurality of horizontal supports 127 configured to support food, including a plurality of airline meal trays (not shown). Positioning the doors 110 at respective ends of the body 120 allows flight attendants to conveniently access food stored within the body 120 from either end of the galley cart 100. In other embodiments, the second door 110b can be omitted if desired, for example, to reduce cost. As further illustrated in FIG. 1B, each of the doors 110 can additionally include a compressible seal 128 configured to seal any gaps that may exist between the doors 110 and corresponding body apertures 126a, 126b when the doors 110 are closed.

In yet another aspect of this embodiment, the galley cart 100 further includes a number of features configured to facilitate movement of the galley cart 100 along a passenger aisle of an aircraft (not shown). One such feature is that the body 120 has a width W sized to fit easily between adjacent passenger seats on opposite sides of a passenger aisle. Another such feature is the provision of handles 106 formed in the top portion 124 of the body shell 121. A further such feature is a plurality of wheels 102 attached to the bottom portion 125 of the body shell 121.

Figure 1C:
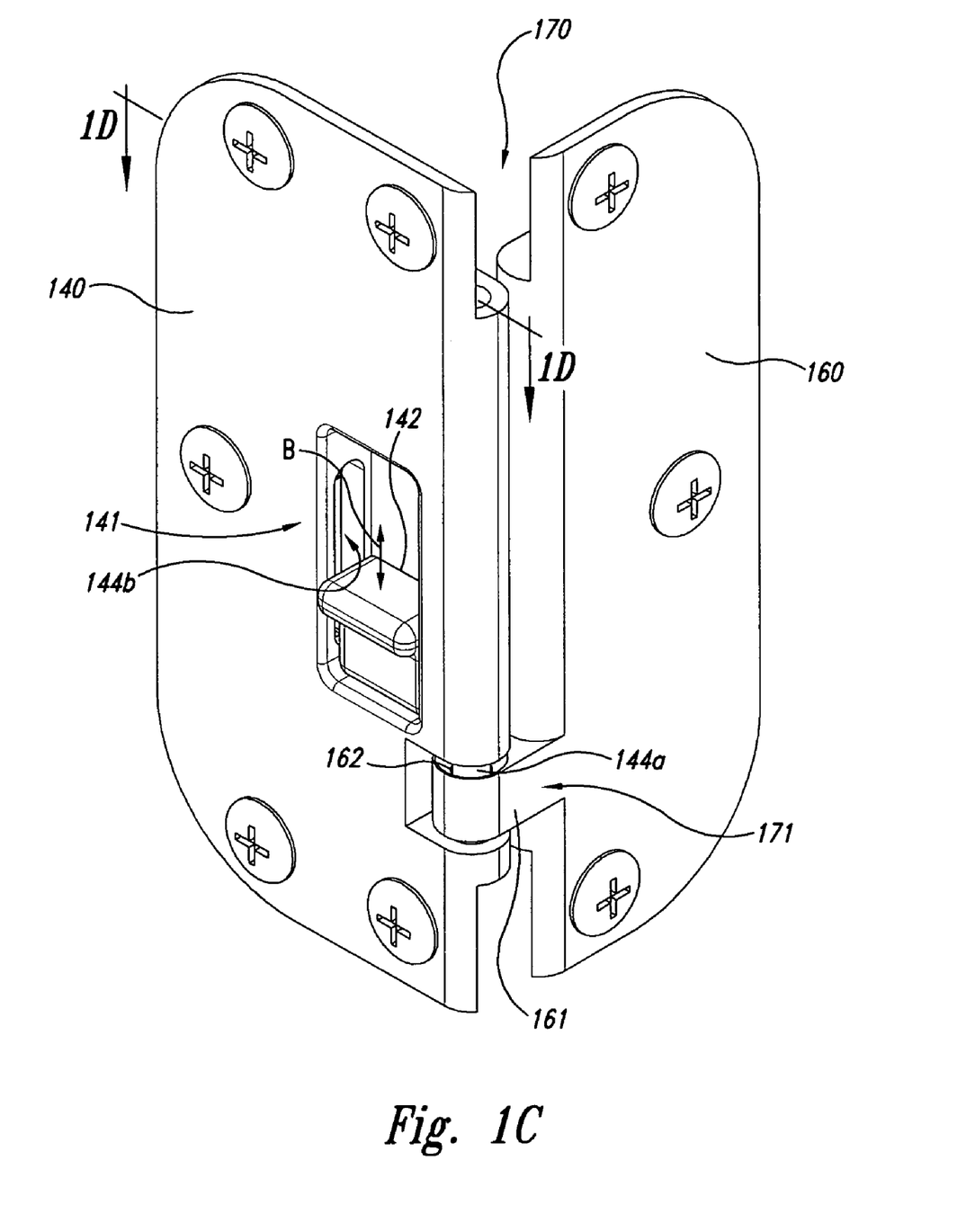
FIGS. 1C-1G illustrate aspects of a latch configured in accordance with an embodiment of the invention.

FIG. 1C is an enlarged isometric illustration of an embodiment of the latch 170 described above with reference to FIGS. 1A-1B. The first portion 140 of the latch 170 can include a slider 142 that carries a first member 144a (e.g., an elongated latching pin). The slider 142 can move upwardly to disengage the first member 144a with the second portion 160, and downwardly to engage the first member 144a with the second portion 160, as indicated by arrow B. The slider 142 can also include a second member 144b (e.g., an elongated guide pin) that is received by a guide 141 to control the motion of the slider 142 relative to the second portion 160. The second portion 160 can include a receptacle unit 161 having an aperture 162 that receives the first member 144a at the latching location 171.

Figure 1D:
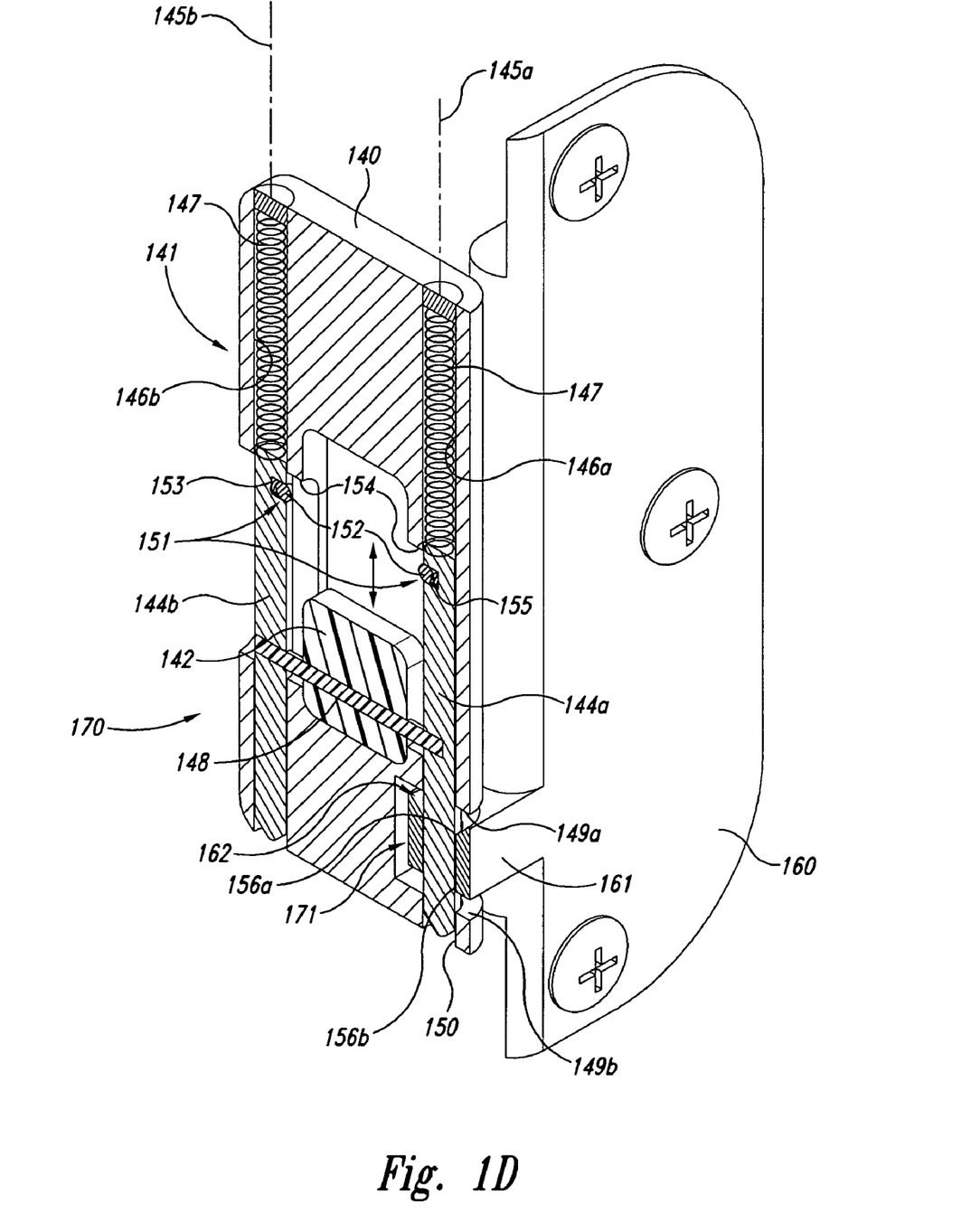

FIG. 1D is a partially schematic, cross-sectional illustration of the latch 170 shown in FIG. 1C, taken substantially along line 1D-1D of FIG. 1C. As shown in FIG. 1D, the guide 141 can include a first guide channel 146a aligned with a first guide path 145a and positioned to slideably receive the first member 144a. A second guide channel 146b is aligned with a second guide path 145b and is positioned to slideably receive the second member 144b. A connector 148 secures the first and second members 144a, 144b to the slider 142. Forcing devices 147 (e.g., springs) attached to the members 144a, 144b force the slider 142 downwardly toward the secured position.

When the slider 142 is in the secured position, the receptacle unit 161 of the latch second portion 160 is positioned between a first surface 149a and a second surface 149b of the first portion 140. Accordingly, the aperture 162 of the receptacle unit 161 is axially aligned with the first member 144a. The first member 144a can accordingly extend downwardly from the first surface 149a, through the aperture 162, and into an opening 150 in the second surface 149b. This can provide a "single-pin, double-shear" securement arrangement because the first member 144a is subjected to shear loads at a first interface 156a and a second interface 156b with the receptacle unit 161. Accordingly, the single latching location 171 is not necessarily constrained to a single plane, and can encompass multiple interfaces between the first portion 140 and the second portion 160. In this particular embodiment, the single latching location extends over less than the entire height of the door 110 (FIG. 1B) on which the latch 170 is installed.

The latch 170 can also include a detent mechanism 151 that provides audible and/or tactile feedback to the user when the latch 170 successfully moves from the unsecured position to the secured position. In one aspect of this embodiment, the detent mechanism 151 can include two balls 152, each housed in a ball groove 153 of one of the members 144a, 144b, and biased toward each other with a ball spring 155. When the slider 142 moves downwardly to the secured position, the balls 152 can move outwardly from the ball grooves 153 as they 152 pass below corresponding detent surfaces 154. At this point, the operator can hear a "click" and/or feel the outward snap of the balls 152. In a particular aspect of this embodiment, the location of the ball grooves 153 relative to the detent surfaces 154 is selected so that the balls 152 move outwardly from the ball grooves 153 only when the first member 144a passes entirely through the aperture 162 of the receptacle unit 161, and into the opening 150 of the first latch portion 140. When the user moves the slider 142 upwardly to the unsecured position, the balls 152 are forced inwardly into their corresponding ball grooves 153 by contact with the detent surfaces 154.

Figure 1E:
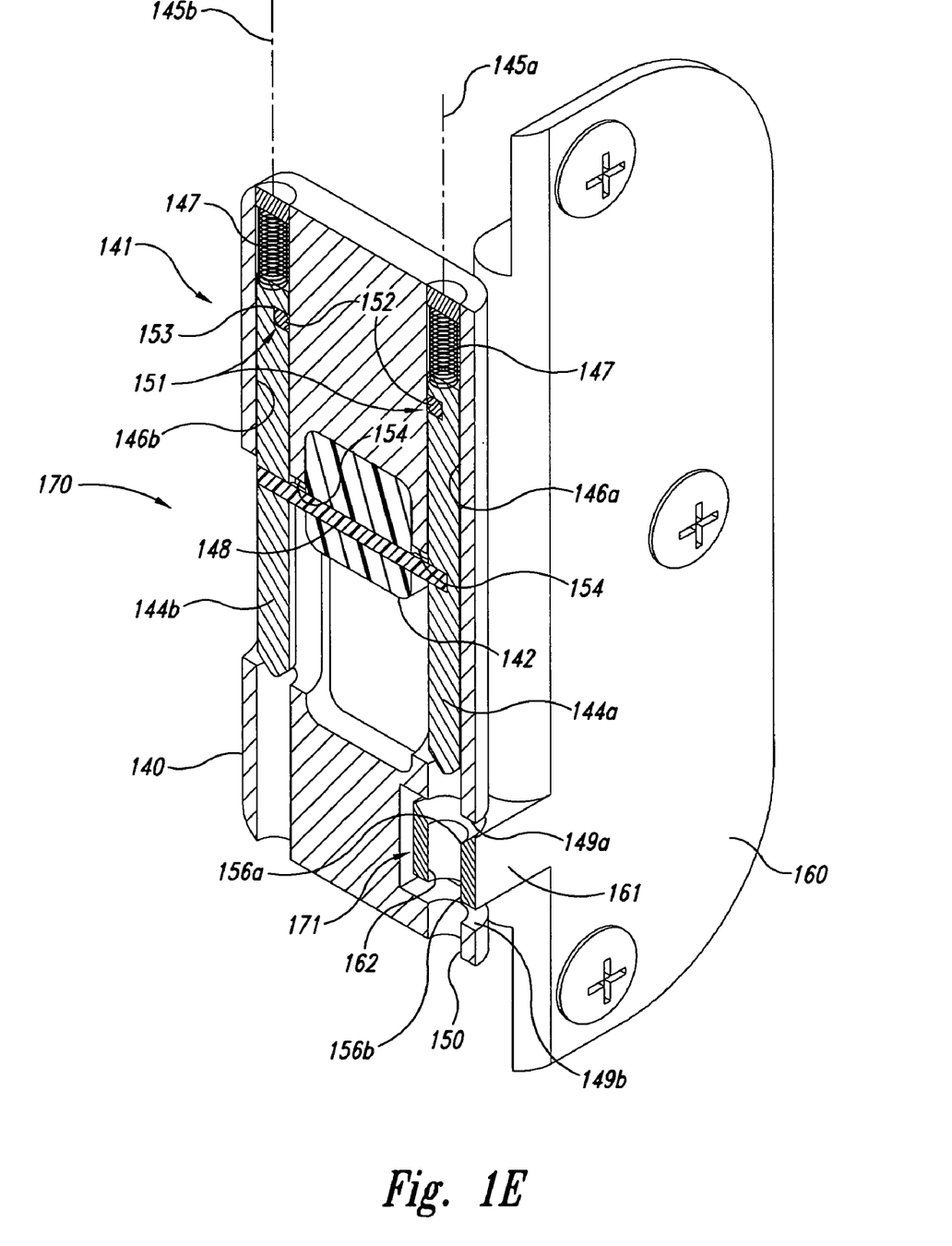

FIG. 1E illustrates the latch 170 in the unsecured position. In this position, the slider 142 is moved upwardly at least until the first member 144a clears both the opening 150 in the first portion 140, and the aperture 162 in the second portion 160. When in this position, the door (to which the first portion 140 is attached) can be pivoted outwardly relative to the body (to which the second portion 160 is attached).

One feature of an embodiment of the latch 170 described above with reference to FIGS. 1A-1E is that it can releasably secure the door 110 relative to the body 120 at less than three locations (e.g., a single latch location 171 as shown in FIGS. 1A-1E). An advantage of this arrangement is that it can reduce the complexity of the latch 170, which can in turn reduce the time and cost associated with installing and maintaining the latch 170, as well as the weight of the latch 170.

Another feature of an embodiment of the latch 170 described above is that the first member 144a can provide latching at a single location 171, but can also provide two shear sites at which shear loads are carried by the first member 144a when an outwardly directed load is placed upon the door to which the latch 170 is attached. An advantage of this arrangement is that it can be more secure and can be less likely to allow the door 110 to flex away from the body 120 than an arrangement having only a single shear load site.

Still another feature of an embodiment of the latch 170 described above is that it can include not only a first or latching member 144a, but also a second or guide member 144b. An advantage of the second member 144a is that it can smoothly guide the motion of the first member 144a. As a result, the slider 142 and the first member 144a can be less likely to bind as they are moved upwardly and downwardly between the secured and unsecured positions.

Still another feature of an embodiment of the latch 170 described above is that it can include forcing devices that force the latch 170 to the secured position. Accordingly, the latch 170 will move to the secured position after the door has been opened and the latch 170 has been released by the user. As a result, the user will be unable to close the door 110 without first moving the latch 170 to the unsecured position, and then allowing the latch to move back to the secured position with the door 110 closed. An advantage of this arrangement is that the user will be less likely to simply close the door 110 without securing it properly, because the latch 170 will prevent such an action.

Yet another feature of an embodiment to the latch 170 described above is that it can include a detent mechanism 151 that provides audible and/or tactile feedback to the user when the latch 170 moves from the unsecured position to the secured position. An advantage of this feature is that it can further reduce the likelihood that the user will close the door 110 and leave the latch 170 in an unsecured position.

Figures 1F, 1G:
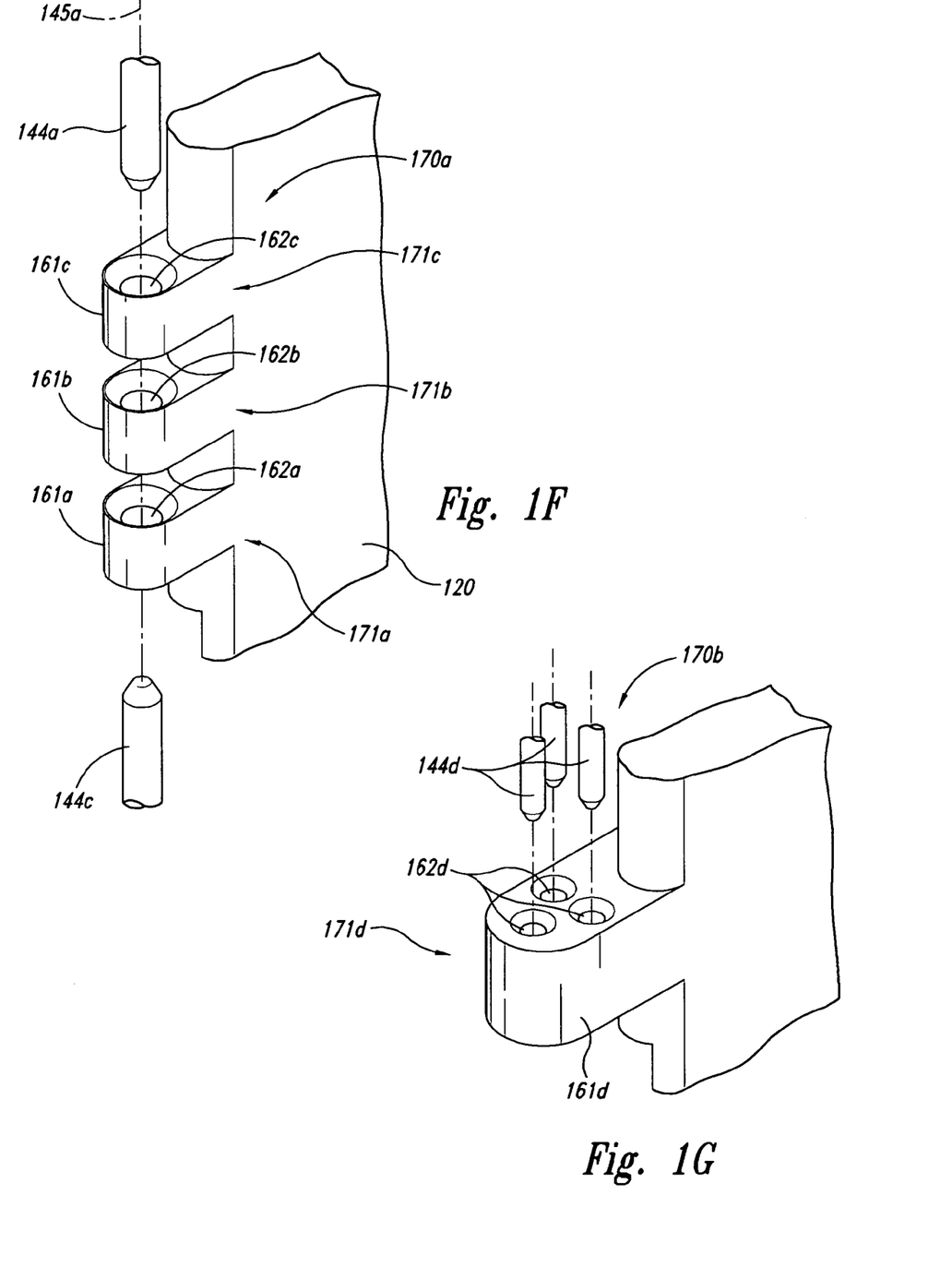

As described above, the latch location 171 is not necessarily constrained to a single plane and can instead include multiple shear planes positioned relatively closely together. FIGS. 1F and 1G illustrated portions of latches having engagement or securement arrangements in accordance with further embodiments of the invention. Referring first to FIG. 1F, a latch 170a can include multiple receptacle units 161a-161c, each of which has a corresponding aperture 162a-162c. Accordingly, the latch 170a can include three latch locations 171a-171c. In one aspect of this embodiment, a single first member 144a moves along the first guide path 145a into all three apertures 162a-162c when in the secured position. In another embodiment, another first member 144c can enter one or more of the apertures 162, in lieu of the first member 144a.

In another embodiment shown in FIG. 1G, a latch 170b can include a single receptacle unit 161d at a single latch location 171d. The receptacle unit 171d can include a plurality of apertures 162d (three are shown in FIG. 1G). The latch 170b can further include a corresponding plurality of first members 144d (three are shown in FIG. 1G).

As discussed above, one feature of some embodiments of the latch 170 is that they engage the body of the galley cart at a single latch location (e.g., in a double-shear arrangement). One characteristic of the door 110 that facilitates this arrangement is the fact that the door 110 can be relatively rigid and can accordingly be less likely to flex than conventional doors, even though the door 110 may be latched at only a single location. Further details of aspects of the door 110, the body 120 to which the door 110 is attached, and the construction of both components are described below with reference to FIGS. 2-6.

Figure 2:
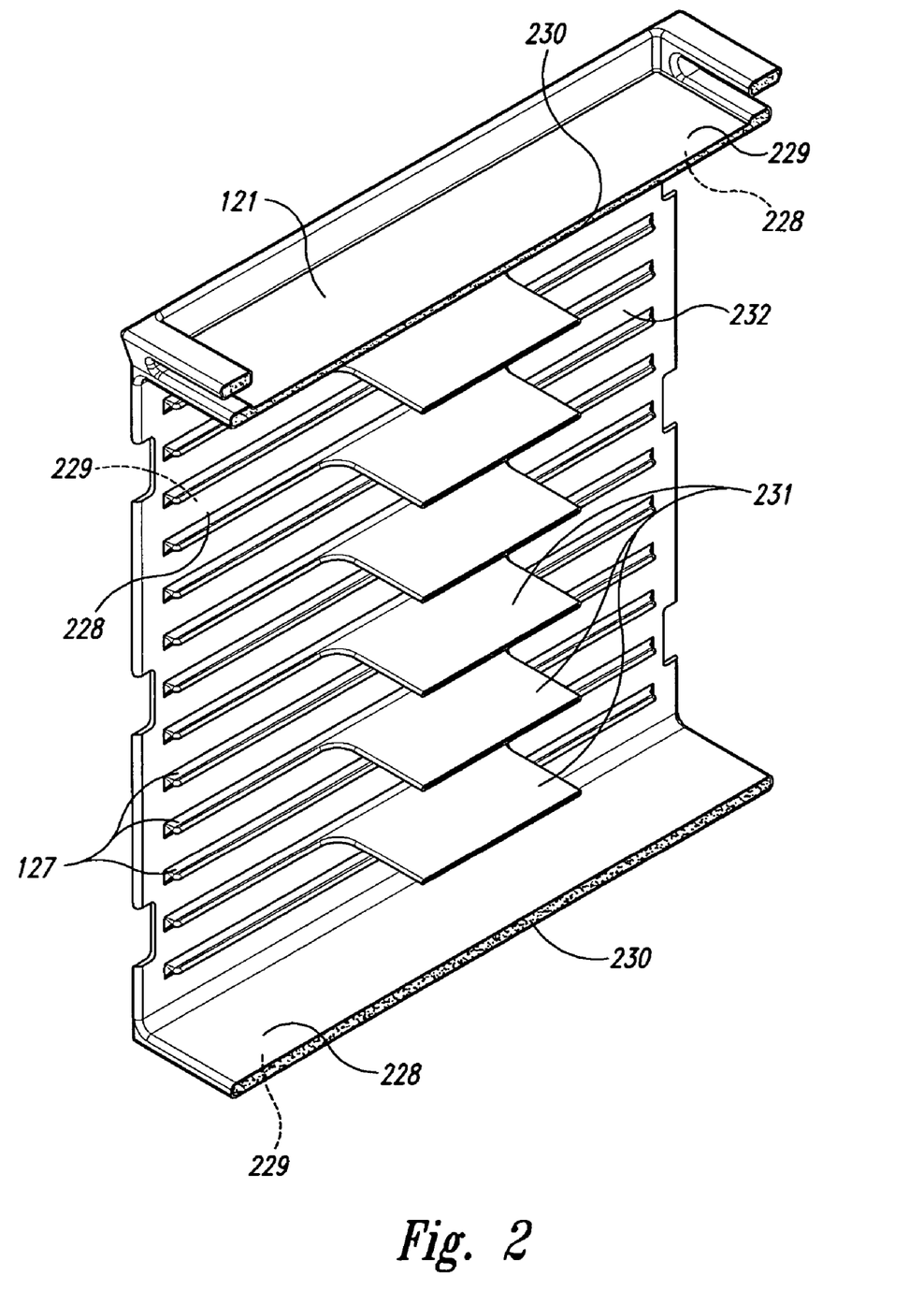
FIG. 2 is an isometric sectioned view of a galley cart body shell configured in accordance with an embodiment of the invention.

FIG. 2 is an isometric view of a section of the body shell 121 configured in accordance with an embodiment of the invention. In one aspect of this embodiment, the body shell 121 includes an inner skin 228 offset from an outer skin 229 in a double-wall configuration. In selected embodiments, a core material 230 can be positioned between the inner skin 228 and the outer skin 229. In one such embodiment, the core material 230 can include a foam material, such as foam plastic. In other embodiments, the core material 230 can include other light-weight insulating materials. In yet other embodiments, the core material 230 can be omitted if desired, for example, to reduce manufacturing costs and/or weight.

In another aspect of this embodiment, the body shell 121 further includes a plurality of horizontal shelves 231 extending inwardly from corresponding horizontal supports 127. In the illustrated embodiment, the horizontal shelves 231 extend all the way across the interior portion 103 of the body 120 (FIG. 1B) from a first interior side surface 232 to an opposing second interior side surface (not shown). The horizontal shelves 231 can provide support for food containers positioned within the interior portion 103. In addition, the horizontal shelves 231 can add rigidity to the body shell 121. In other embodiments, the horizontal shelves 231 can have shapes other than those illustrated in FIG. 2, or they can be omitted.

The body shell 121 can be manufactured using a number of different techniques, including plastic molding methods. For example, in one embodiment, the body shell 121 can be manufactured using a rotational molding method. In this embodiment, a suitable thermoplastic resin is loaded into a mold having an interior cavity in the shape of the body shell 121. The mold is heated to melt the plastic resin and rotated about two orthogonal axes to distribute the melted resin over the interior surfaces of the mold. The mold continues to rotate as it cools. After cooling, the body shell 121 is removed from the mold. One advantage of the rotational molding process is that it provides a cost-effective method for producing the double-wall portions of the body shell 121.

Another method for forming the body shell 121 in accordance with an embodiment of the invention involves structural foam molding. In this embodiment, molten plastic resin is injected into a mold after being mixed with a blowing agent or a high-pressure gas. The blowing agent produces bubbles in the molten plastic resin causing it to foam inside the mold. The plastic resin in contact with the interior mold surfaces forms opposing skins in a double-wall configuration, while the blowing agent expands the rest of the plastic resin to form a cellular foam structure between the skins. One advantage of this technique is that it provides a cost-effective method for producing embodiments of the body shell 121 that include skin/foam/skin sandwich portions. In another embodiment, the body shell 121 can be manufactured by injection molding using, for example, polyetherimide resin.

Other molding techniques can be used to produce the body shell 121 without departing from the spirit or scope of the present invention. Such methods include, but are not limited to: low-pressure injection molding, high-pressure injection molding, reaction injection molding, gas counter-pressure injection molding, co-injection or sandwich injection molding, and gas-assisted injection molding. Examples of these and other suitable molding methods can be found in "Design for Manufacturing Handbook" (2nd Ed.), Chapter 6.3, by James G. Bralla.

Although the body shell 121 of the illustrated embodiment includes portions having double-wall construction, in other embodiments, the body shell 121 can include portions of single-wall construction. However, one advantage of the double-wall construction is the added strength and insulating capability provided by the core material 230 (or dead airspace, as the case may be) between the inner skin 228 and the outer skin 229.

Figure 3:
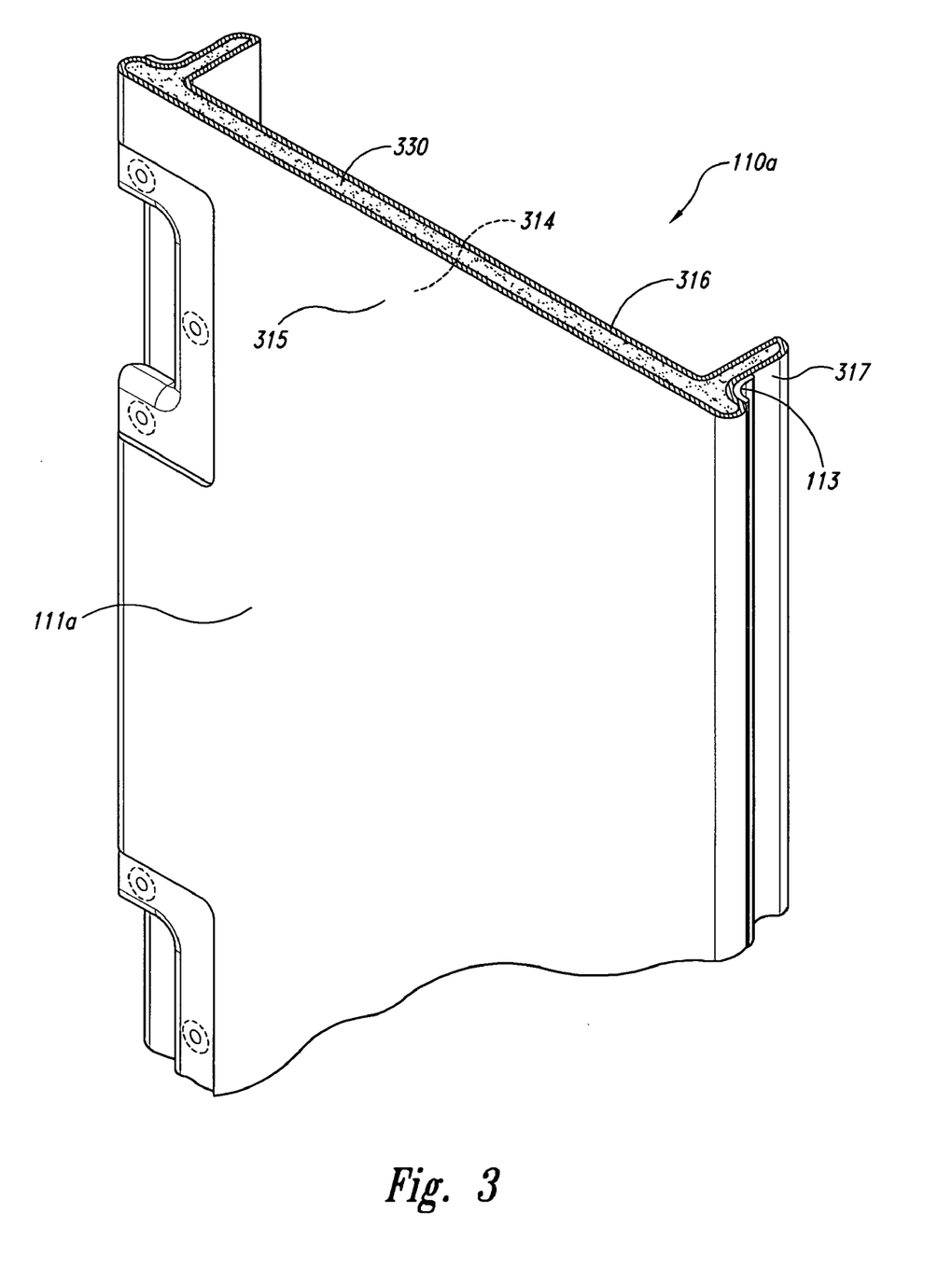
FIG. 3 is an enlarged isometric sectioned view of a galley cart door configured in accordance with an embodiment of the invention.

FIG. 3 is an enlarged isometric view of a section of the first door 110a configured in accordance with an embodiment of the invention. In one aspect of this embodiment, the door shell 111a includes an inner door skin 314 offset from an outer door skin 315 in a double-wall configuration. A core material 330, e.g., plastic foam material, can be positioned between the inner door skin 314 and the outer door skin 315 to enhance the structural or insulative characteristics of the door 110a. In other embodiments, the core material 330 can be omitted, for example, to reduce cost and/or weight. In another aspect of this embodiment, the door shell 111a can be manufactured using any one of the plastic molding methods described above for the body shell 121.

In a further aspect of this embodiment, the door shell 111a includes a lip portion 317 protruding inwardly from a panel portion 316 at least proximate to the perimeter of the door shell 120a. The seal 113 can be attached along the outboard base of the lip portion 317 so that the seal 113 seats partially on the lip portion 317 and partially on the adjacent inner door skin 314. Positioning the seal 113 in this manner can effect a better seal between the door shells 111 and the corresponding body apertures 126 (FIG. 1B) than would otherwise be achieved by a conventional flat seal positioned only on the inner door skin 314.

One advantage of forming the body 120 and the doors 110 (FIGS. 1A and 1B) out of one-piece plastic shells is that assembly time can be greatly reduced because of the reduced part count. As a result, the galley cart 100 can be manufactured relatively inexpensively when compared to conventional galley carts manufactured from metal parts. A further advantage of manufacturing the body 120 and the doors 110 in this manner is that it results in a relatively light-weight galley cart. Yet another advantage is associated with the double-wall construction of the body shell 121 and the door shells 111. Double-wall panels having air and/or a cellular core material between the inner and outer skins have relatively high thermal insulating characteristics.

Figure 4:
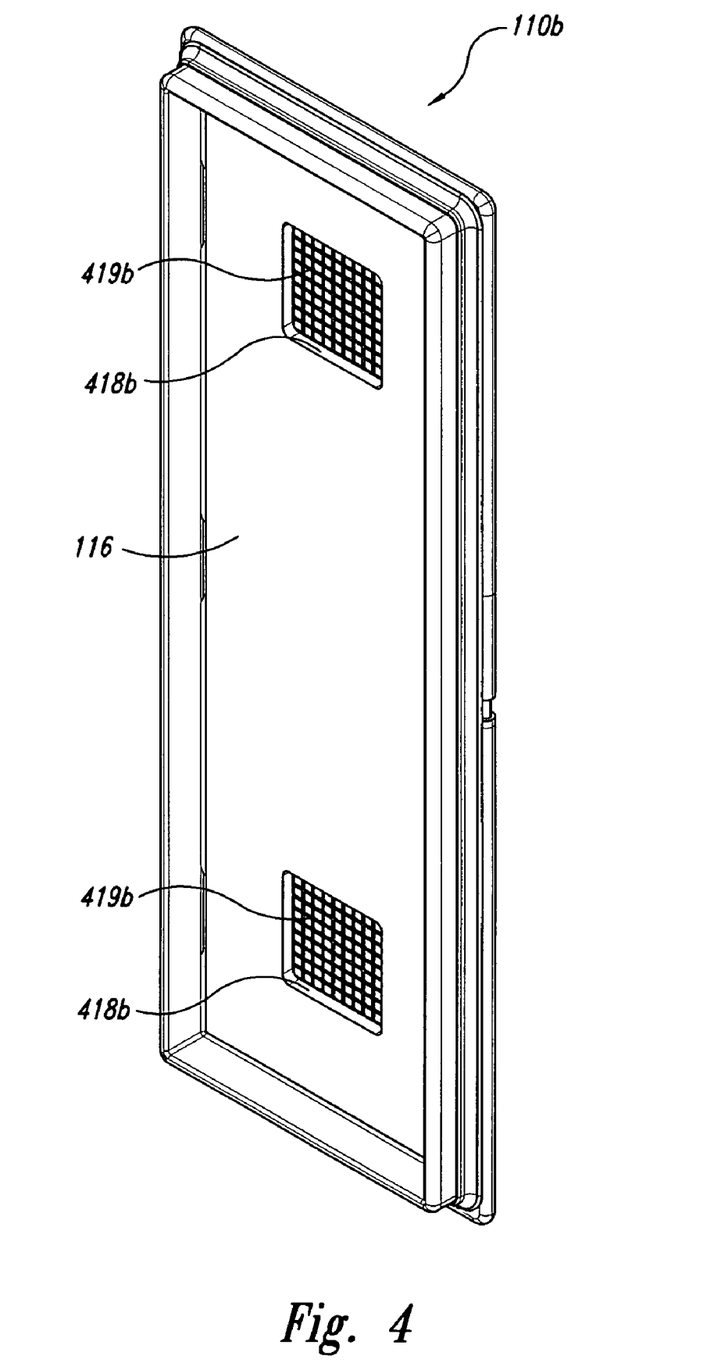
FIG. 4 is an enlarged isometric view of another galley cart door configured in accordance with a further embodiment of the invention.

FIG. 4 is an enlarged isometric view of the second door 110b configured in accordance with an embodiment of the invention. The second door 110b can be at least generally similar in structure and function to the first door 110a described above with reference to FIG. 3. In one aspect of this embodiment, however, the second door 110b further includes a plurality of air apertures 418 (identified individually as a first air aperture 418a and a second air aperture 418b) formed in the second door shell 111b. The first air aperture 418a can be configured to receive cool air from an exterior source (not shown) for cooling the interior portion 103 of the galley cart 100 (FIG. 1B). The second air aperture 418b can be configured to let air exit the interior portion 103 as the cooler air is flowing in through the first air aperture 418a. In addition, the second door 110b can further include a first vent grating 419a and a second grating 419b positioned over the corresponding air apertures 418 to facilitate the circulation of cool air through the galley cart 100. In other embodiments, one or more of the air apertures 418 can be omitted. For example, in one embodiment, the second air aperture 418b can be omitted and over-pressure air can flow out of the interior portion 103 via minor gaps between the doors 110 and the body 120. In a further embodiment, the second air aperture 418b can be configured to let air enter the interior portion 103, and the first air aperture 418a can be configured to let air exit. In other embodiments, both of the air apertures 418 can be omitted if cool air circulation is not necessary or desired for the galley cart 100.

Figure 5:
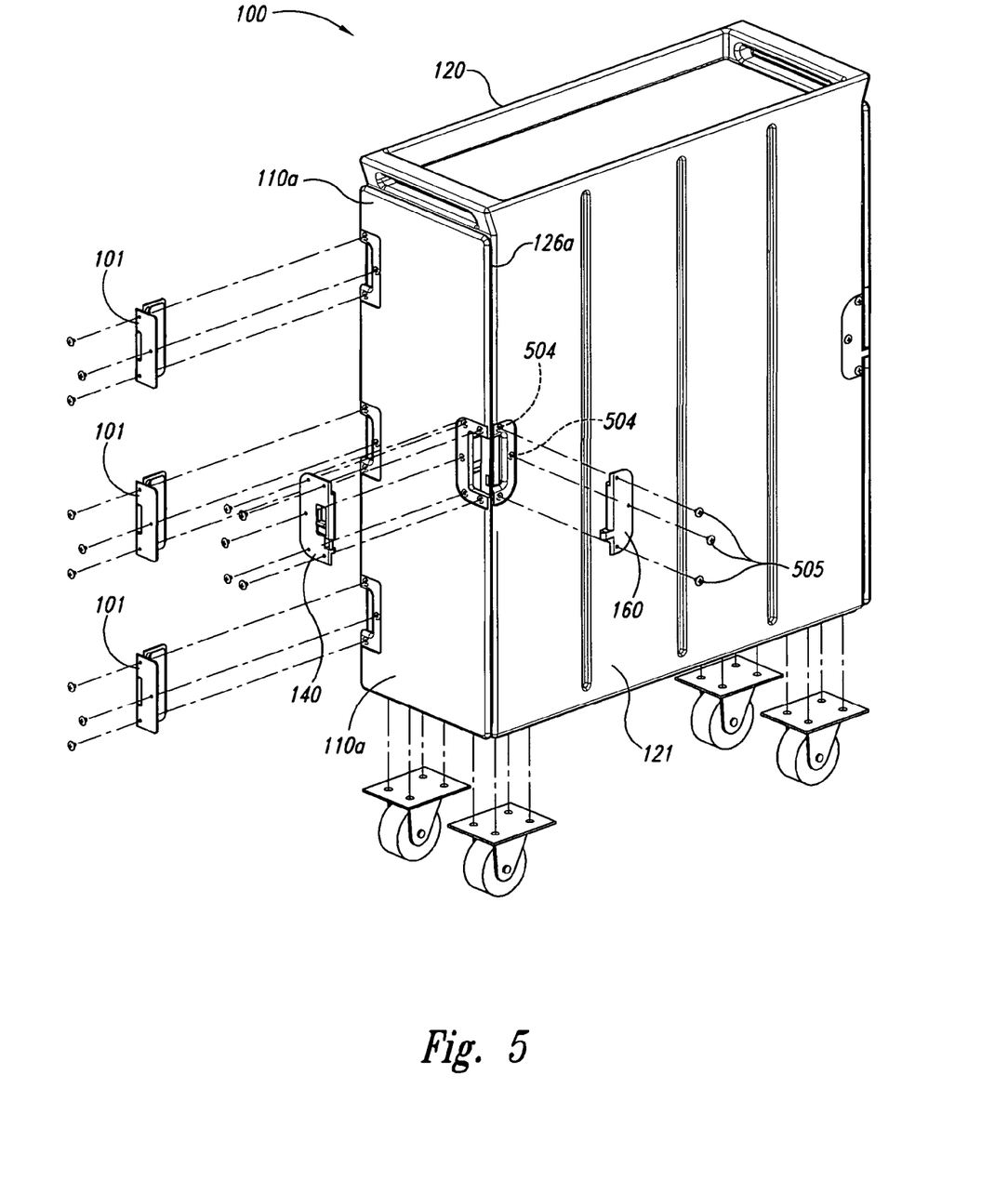
FIG. 5 is an exploded isometric view of the galley cart of FIGS. 1A and 1B illustrating some hardware attachment features configured in accordance with an embodiment of the invention.

FIG. 5 is an exploded isometric view of the galley cart 100 illustrating hardware attachment features configured in accordance with an embodiment of the invention. In one aspect of this embodiment, the body 120 can include a plurality of inserts 504 molded into the body shell 121 proximate to the first door aperture 126a. The inserts 504 can be individual threaded inserts configured to receive corresponding threaded fasteners 505 that attach the second latch portion 160 to the body shell 121. In another arrangement, the inserts 504 can be replaced by one or more plates (not shown) having a plurality of threaded holes configured to receive the corresponding fasteners 505. In another aspect of this embodiment, the inserts 504 can be made from a metal material, such as steel, or titanium, or aluminum. In other embodiments, the inserts 504 can be made from nonmetallic materials, such as resin-based materials. In further embodiments, the inserts 504 can be omitted, and the fasteners 505 can engage other features, such as threaded holes formed directly in the body shell 121, to attach the second latch portion 160 to the body shell 121.

In a further aspect of this embodiment, other parts of the galley cart 100 can be attached to the body 120 and/or the doors 110 using inserts similar to the inserts 504 described above. For example, in one embodiment, the wheels 102 can be attached to the body shell 121 in a similar manner. Similarly, in another embodiment, the hinges 101 can be attached to the door shells 111 and the body shell 121 in a similar manner.

Figure 6:
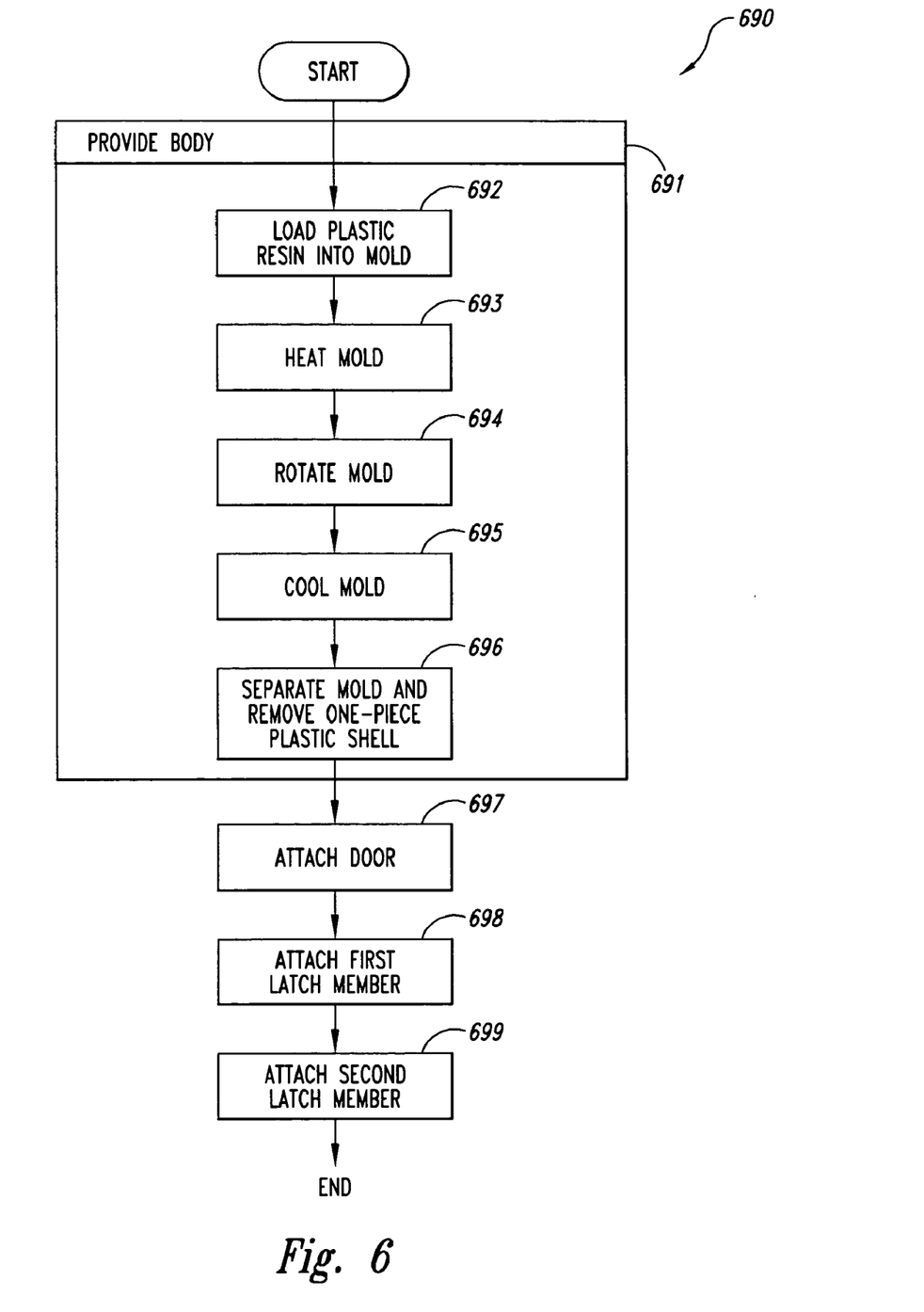
FIG. 6 is a flow diagram illustrating a method for manufacturing an aircraft galley cart in accordance with an embodiment of the invention.

FIG. 6 is a flow diagram illustrating a method 690 for manufacturing an aircraft galley cart in accordance with an embodiment of the invention. In block 691, the method 690 can include providing a galley cart body. This process can in turn include load a plastic resin into a mold of the one-piece plastic shell (block 692). In one embodiment, loading plastic resin into the mold can include injecting molten plastic resin into the mold. In another embodiment, dry plastic resin can be loaded into the mold and, as shown in block 693, the mold can heated to melt the plastic resin. In block 694, the mold can be rotated to distribute the molten plastic resin over the interior surface of the mold. In one embodiment, the combination of heating and rotating the mold causes the plastic resin to form an inner and outer skin in a double-wall configuration. In block 695, the mold can be cooled to harden the plastic resin. In one embodiment, the mold can be cooled as it continues to rotate. In block 696, the method 690 can further include separating the mold after it is sufficiently cooled and removing the one-piece plastic shell from the mold.

In block 697, a door can be attached to the completed body provided in block 691. In block 698, a first latch member can be attached to one of the door and the body, and in block 699, a second latch member can be attached to the other of the door and the body. The first and second latch members can have any of the characteristics described above with reference to FIGS. 1A-1G. The method 690 ends after block 699.

After manufacturing the one-piece plastic shell in accordance with the method 600, additional assembly steps can be taken to complete manufacture of the galley cart. For example, one or more doors can be added to the one-piece plastic shell to provide access to the enclosed interior portion. Additionally, one or more rollers can be added to the bottom portion of the shell to provide mobility.

From the foregoing, it will be appreciated that specific embodiments of the invention have been described herein for purposes of illustration, but that various modifications may be made without deviating from the spirit and scope of the invention. Aspects of the invention described in the content of particular embodiments can be combined or eliminated in other embodiments. For example, latches having characteristics generally similar to those described above can be installed on aircraft galley carts having different configurations than those described above, and/or manufactured in accordance with methods that differ from those described above. In further embodiments, such latches can be installed on devices other than aircraft galley carts. Accordingly, the invention is not limited except as by the appended claims.

The invention claimed is:

1. An aircraft galley cart, comprising:
   a body having a payload compartment, the body being sized to move along an aircraft seat aisle;
   a plurality of wheels attached to the body;
   a generally rigid door pivotably attached to the body and movable between an open position and a closed position; and
   a latch having:
      a receptacle unit attached to one of the body and the door, the receptacle unit having an aperture with a chamfered entrance;
      a guide coupled to the other of the body and the door, the guide having a first channel and a second channel generally parallel to the first channel, the guide further having a first surface and a second surface facing toward the first surface;
      a slider with a grip portion configured to be manipulated by a user, the slider being carried by the guide and movable relative to the guide between a secured position and an unsecured position, wherein the aperture of the receptacle is positioned between the first and second surfaces of the guide when the slider is in the secured position;
      a first member carried by the slider, received in the first channel of the guide and having a chamfered end;
      a second member carried by the slider and received in the second channel of the guide, the first member (a) being received in the aperture of the receptacle unit and (b) extending entirely through the aperture and into an opening in the second surface of the guide when the slider is in the secured position to releasably secure the door relative to the body at only a single location, the first member being external to the aperture when the slider is in the unsecured position, the first member being the only one of the first and second members to be received by the receptacle unit; and
      a forcing device positioned to force the slider toward the secured position.

2. The galley cart of claim 1 wherein the door includes a frame portion and a panel portion carried by the frame portion, the frame portion being attached to the panel portion to resist bending of the panel portion.

3. The galley cart of claim 1 wherein the latch is the only latch releasably securing the door to the body of the galley cart.

4. The galley cart of claim 1 wherein door is pivotable relative to the body about a pivot axis, and wherein the door has a first edge generally transverse to the pivot axis and a second edge spaced apart from the first edge and generally transverse to the pivot axis, and wherein the latch engages the body at only a single location between the first and second edges, the single location extending over less than the distance between the first and second edges.

5. The galley cart of claim 1 wherein the latch further includes a detent mechanism positioned to provide audible, tactile or both audible and tactile feedback when the latch moves from the unsecured position to the secured position.

6. The galley cart of claim 1 wherein the payload compartment includes shelves positioned to carry food items.

7. A method for using an aircraft galley cart, comprising:
   moving a galley cart along an aircraft seat aisle;
   preparing the galley cart for access by moving a door latch of the galley cart from a secured position to an unsecured position;
   opening the door of the galley cart after moving the door latch to the unsecured position;
   accessing a body of the galley cart through the open door;
   closing the door of the galley cart; and
   at least restricting access to the galley cart by moving the door latch from the unsecured position to the secured position, with the door latch releasably coupling the door to the body of the galley cart at only a single location, wherein moving the door latch includes:
      contacting a slider portion of the latch, the slider portion being operatively coupled to the door;
      moving the slider portion of the latch relative to a guide portion of the latch against a force provided by a forcing device that forces the latch toward the secured position so that a first member of the slider portion slides along a first guide path of the guide portion and a second member of the slider portion slides along a second guide path of the guide portion, the first and second guide paths being generally parallel to each other;

allowing the forcing device to drive the first member along the first guide path into and through an aperture of a receptacle unit carried by the body of the galley cart, and into an opening in the guide portion of the latch, while the receptacle is positioned between the first guide path and the opening, without having the second member engage with or disengage from the receptacle unit.

8. The method of claim 7 wherein door is pivotable relative to the body about a pivot axis, and wherein the door has a first edge generally transverse to the pivot axis and a second edge spaced apart from the first edge and generally transverse to the pivot axis, and wherein moving the door latch from the unsecured position to the secured position includes releasably securing the door to the body of the galley cart at only a single location between the first and second edges, the single location extending over less than a distance between the first and second edges.

9. The method of claim 7, further comprising receiving audible, tactile or both audible and tactile feedback when the latch moves from the unsecured position to the secured position.

* * * * *